(12) United States Patent
Liang et al.

(10) Patent No.: US 12,317,122 B2
(45) Date of Patent: May 27, 2025

(54) METHOD OF AUTHORIZATION FOR NETWORK SLICING

(71) Applicant: ZTE CORPORATION, Guangdong (CN)

(72) Inventors: Shuang Liang, Shenzhen (CN); Jinguo Zhu, Shenzhen (CN); Fei Lu, Shenzhen (CN); Zhijun Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 452 days.

(21) Appl. No.: 17/560,842

(22) Filed: Dec. 23, 2021

(65) Prior Publication Data

US 2022/0116816 A1 Apr. 14, 2022

Related U.S. Application Data

(63) Continuation of application No. PCT/CN2019/094516, filed on Jul. 3, 2019.

(51) Int. Cl.
*H04W 28/02* (2009.01)
*H04L 9/40* (2022.01)
(Continued)

(52) U.S. Cl.
CPC ..... *H04W 28/0268* (2013.01); *H04L 63/0892* (2013.01); *H04M 15/66* (2013.01);
(Continued)

(58) Field of Classification Search
CPC ....... H04L 69/00; H04L 47/24; H04L 49/116; H04L 49/1538; H04L 47/805;
(Continued)

(56) References Cited

U.S. PATENT DOCUMENTS

| | | | |
|---|---|---|---|
| 2017/0331785 | A1 | 11/2017 | Xu et al. |
| 2017/0339609 | A1* | 11/2017 | Youn ................. H04W 36/0011 |

(Continued)

FOREIGN PATENT DOCUMENTS

| | | |
|---|---|---|
| CN | 107426776 A | 12/2017 |
| CN | 109548098 A | 3/2019 |

(Continued)

OTHER PUBLICATIONS

R2-1708110, "Signalling of slice info for NW slice", Aug. 21-25, 2017, pp. 1-3 (Year: 2017).*

(Continued)

*Primary Examiner* — Salvador E Rivas
(74) *Attorney, Agent, or Firm* — Foley & Lardner LLP

(57) ABSTRACT

Systems and methods for wireless communications are disclosed herein. In one embodiment, the system and method are configured to receive, by a mobility management function (AMF) from a network function (NF), slice information including at least one of a quality of service (QoS) profile for a slice or a service area of the slice. The AMF can determine that a wireless communication device is authorized to access a slice based on the service area of the slice. The AMF can send the QoS profile comprising a slice-specific aggregate maximum bit rate (AMBR) specific to the slice to the radio access network.

20 Claims, 5 Drawing Sheets

(51) Int. Cl.
| | |
|---|---|
| *H04M 15/00* | (2006.01) |
| *H04W 12/06* | (2021.01) |
| *H04W 28/24* | (2009.01) |
| *H04W 48/18* | (2009.01) |
| *H04L 69/00* | (2022.01) |
| *H04W 4/60* | (2018.01) |

(52) U.S. Cl.
CPC ....... *H04W 12/06* (2013.01); *H04W 28/0257* (2013.01); *H04W 28/24* (2013.01); *H04W 48/18* (2013.01); *H04L 69/00* (2013.01); *H04W 4/60* (2018.02)

(58) Field of Classification Search
CPC .... H04L 67/61; H04W 4/60; H04W 28/0257; H04W 52/26; H04W 28/0268; H04W 28/0967; H04B 7/264; H04B 7/2659
See application file for complete search history.

(56) References Cited

U.S. PATENT DOCUMENTS

| | | | |
|---|---|---|---|
| 2018/0317163 A1 | 11/2018 | Lee et al. | |
| 2018/0324633 A1* | 11/2018 | Lee | H04L 47/24 |
| 2019/0029065 A1 | 1/2019 | Park et al. | |
| 2020/0196130 A1* | 6/2020 | Tamura | H04W 8/02 |
| 2020/0314701 A1* | 10/2020 | Talebi Fard | H04W 36/0016 |
| 2020/0351702 A1* | 11/2020 | Stojanovski | H04W 28/0268 |
| 2021/0076166 A1* | 3/2021 | Navratil | H04W 4/08 |

FOREIGN PATENT DOCUMENTS

| | | |
|---|---|---|
| CN | 109743213 A | 5/2019 |
| CN | 109842910 A | 6/2019 |
| EP | 3 461 209 A1 | 3/2019 |
| EP | 3 471 464 A1 | 4/2019 |
| WO | WO-2019/114938 A1 | 6/2019 |

OTHER PUBLICATIONS

Rodini, Fernando. "QoS/QoE developments in 4G-IoT & 5G technologies." Presentation from Qualcomm, ITU Workshop on Telecommunications Service Quality, Nov. 2017, pp. 1-11 (Year: 2017).*
3GPP, "TS 23.501 V.15.3.0", Sep. 2018 (Year: 2018).*
R2-1704976, "QoS Parameters", May 15-19, 2017, pp. 1-3 (Year: 2017).*
International Search Report and Written Opinion on PCT/CN2019/094516 dated Apr. 1, 2020 (10 pages).
Qualcomm Incorporated, TS 23.501 "Clarifications to Slice-Specific Authentication and Authorisation," SA WG2 Meeting #S2-134 S2-1907099, Sapporo, Japan, Jun. 28, 2019 (6 pages).
ZTE Corporation, "AMF capability of Network Slice-Specific Authentication and Authorization," SA WG2 Meeting #S2-134 S2-1907413, Sapporo, Japan, Jun. 28, 2019 (3 pages).
Partial Supplementary European Search Report on EP 19936507.3. dated Jun. 14, 2022 (15 pages).
Extended European Search Report for EP Appl. No. 19936507.3 dated Nov. 9, 2022 (14 pages).
Samsung: "Mobility restriction area per network slice," SA WG2 Meeting #118-BIS; S2-170262; Spokane, USA; Jan. 16-20, 2017 (3 pages).
First Examination Report for IN App. No. 202227000314 dated Dec. 21, 2023 (with English translation, 5 pages).
Huawei et al., "QoS Parameters", 3GPP TSG-RAN WG2 Meeting #98, R2-1704976, May 19, 2017, Hangzhou, China (3 pages).
Office Action for KR Appl. No. 10-2022-7002457, dated Jun. 24, 2024 (with English translation, 10 pages).
Ericsson (rapporteur), "Report of email discussion [97bis#16][NR] QoS parameters (Ericsson)," 3GPP TSG-RAN WG2 #98; R2-1704378; Hangzhou, China; May 14-19, 2017 (12 pages).
First Office Action for CN App. No. 201980099566.5 dated Oct. 17, 2024 (with English translation, 19 pages, received Nov. 4, 2024).
Vivo, "Consideration for additional QoS parameter," 3GPP TSG RAN WG2 NR Ad Hoc; R2-1706961; Qingdao, China; Jun. 27-29, 2017 (3 pages).
Vivo, "Schedule-based resource sharing for network slicing," 3GPP TSG RAN WG2 Meeting#97; R2-1701483; Athens, Greece; Feb. 13-17, 2017 (4 pages).

* cited by examiner

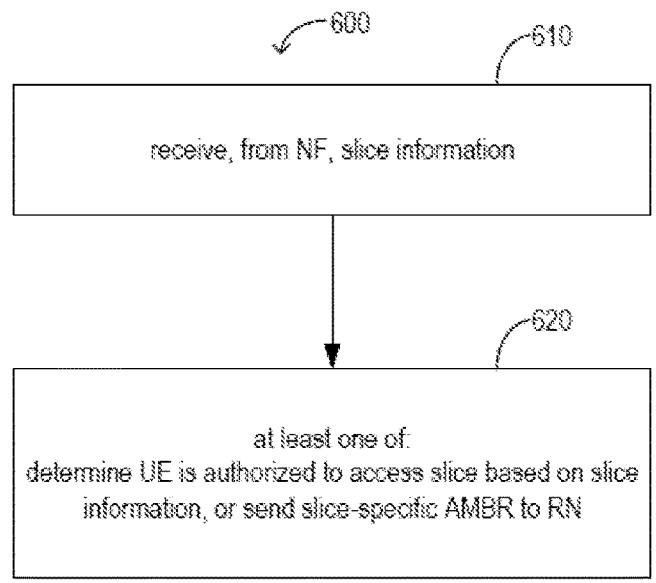
FIG. 6
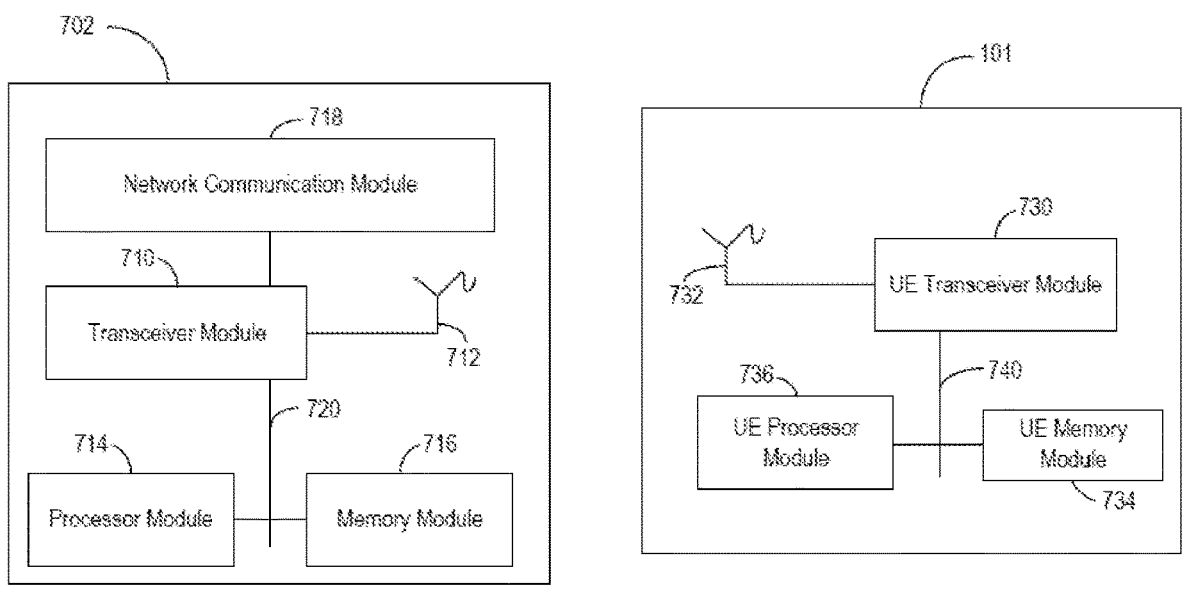
FIG. 7A
FIG. 7B

METHOD OF AUTHORIZATION FOR NETWORK SLICING

CROSS-REFERENCE TO RELATED APPLICATION

This application claims the benefit of priority under 35 U.S.C. § 120 as a continuation of International Patent Application No. PCT/CN2019/094516, filed on Jul. 3, 2019, the disclosure of which is incorporated herein by reference in its entirety.

TECHNICAL FIELD

The disclosure relates generally to wireless communications and, more particularly, to systems and methods for authorizing network slicing.

BACKGROUND

No present systems and methods exist for retrieving slice information such as a slice-specific aggregated maximum bit rate (AMBR) for a slice and a service area of the slice.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method includes receiving, by a mobility management function (AMF) from a network function (NF), slice information comprising at least one of a quality of service (QoS) profile for a slice or a service area of the slice, and at least one of determining, by the AMF, that a wireless communication device is authorized to access a slice based on the service area of the slice, or sending, by the AMF, the QoS profile comprising a slice-specific AMBR specific to the slice to the radio access network. The radio access network enforces rate control with respect to the slice for the wireless communication device based on the slice-specific AMBR.

In some embodiments, a wireless communication method includes receiving, by a radio access network from an AMF for the radio access network, a QoS profile including a slice-specific AMBR specific to the slice, and enforcing, by the radio access network, rate control with respect to the slice for the wireless communication device based on the slice-specific AMBR.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 6 is a flow diagram illustrating an example method for retrieving and using slice information from a NF, in accordance with an embodiment of the present disclosure.

FIG. 7A illustrates a block diagram of an example base station, in accordance with some embodiments of the present disclosure.

FIG. 7B illustrates a block diagram of an example a user equipment (UE), in accordance with some embodiments of the present disclosure.

DETAILED DESCRIPTION OF EXAMPLE EMBODIMENTS

Figure 1:
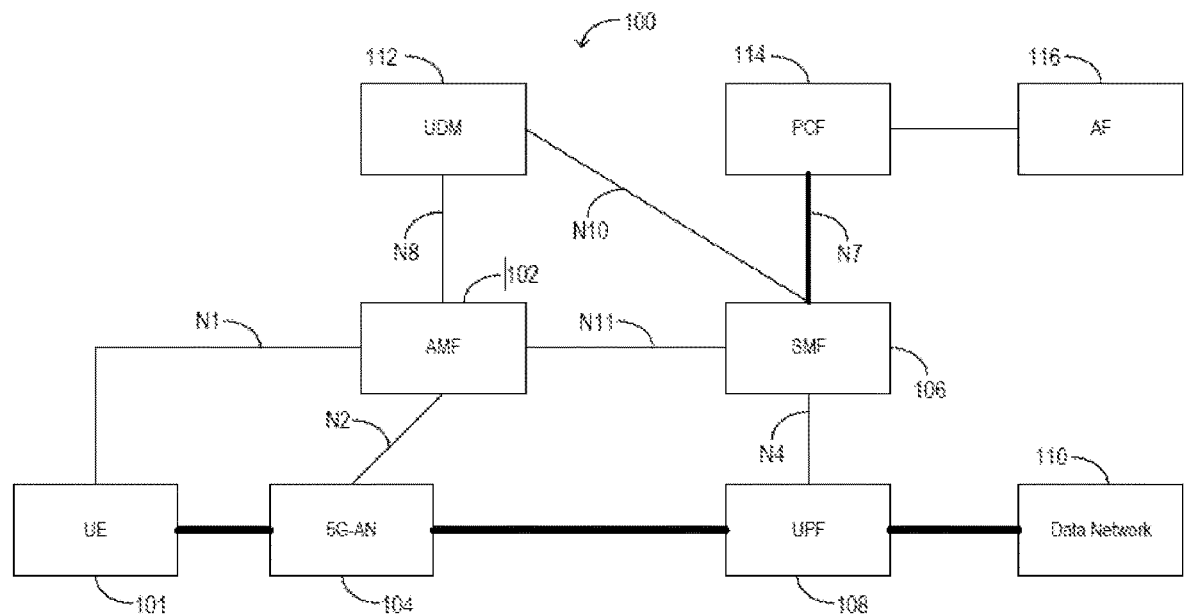
FIG. 1 is a block diagram illustrating an example network system architecture, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In some wireless communication networks, a maximum flow bit rate (MBR) is QoS parameter used for rate control. For example, an AMBR, which is a type of MBR, is used to control the rate of a non-guaranteed flow bit rate (non-GBR) flow. Based on aggregate granularity, the AMBR can be a protocol data unit (PDU) session-AMBR, a user equipment (UE)-AMBR, or so on. The PDU session-AMBR controls the aggregate maximum bit rate for a PDU session. The UE-AMBR controls an aggregate maximum bit rate for all activate PDU sessions of a given UE. The next generation radio access network (NR) can enforce the UE-AMBR and PDU-AMBR.

In some wireless communication networks (e.g., a 5G system (5GS) network), network slicing can be used by an operator to deploy multiple network slices for delivering same features for different groups of UEs. Network slicing is a network architecture having software or virtual network functions that partition physical network architectures into software/virtual components. A slice refers to a portion of a physical network infrastructure that is provided for a particular scenarios or a customer use case (e.g., under a service level agreement (SLA)). Each slice includes resources (dedicated to that slice or shared among multiple slices) such as but not limited to, network bandwidth, processing power, storage, and so on. A UE can access multiple slices simultaneously using network slicing as the UE accesses a network. Network slices can differ for various supported features and different network function optimizations. The requirements for enforcing a slice-specific AMBR are proposed by operators. A slice-specific AMBR (or slice-AMBR) is the AMBR that limits an aggregate bit rate of all the non-GBR radio bearers of a given slice. Retrieving and enforcing the slice-specific AMBR has not been specified. In addition, traditionally, authorization of slice does not factor a current location of the UE into consideration. In some deployments (such as but not limited to those in which specific slices are deployed for enterprises), access to such slices is not limited in terms of the geographical extent in any way.

FIG. 1 is a block diagram illustrating an example network system architecture 100, in accordance with an embodiment of the present disclosure. Referring to FIG. 1, the example of the network system architecture 100 is a 5GS architecture. The network system architecture 100 includes various NFs such as but not limited to, an AMF 102, a session management function (SMF) 106, a user plane function (UPF) 108, a UDM 112, a PCF 114, an application function (AF) 116, and so on The AMF 102 includes functionalities such as but not limited to, UE mobility management, reachability management, connection management, and so on. For example, the AMF 102 is where a communication protocol (CP) interface N2 of a radio access network (RAN) and a non-access stratum (NAS) CP interface N1 determinate. The CP interface N2 is used for a communication link between the RAN (e.g., a 5G-access network (AN) 104) and the AMF 102. The NAS CP interface N1 is used for a communication link between a UE 101 (e.g., a wireless communication device) and the AMF 102. The AMF 102 also performs NAS ciphering and integrity protection. The UE 101 is connected to the 5G-AN 104.

Furthermore, the AMF 102 distributes session management (SM) NAS to appropriate SMFs (e.g., the SMF 106) via CP interface N11. The SMF 106 includes functions such as but not limited to, UE internet protocol (IP) address allocation and management, selection and control of user plane (UP) functions, PDU connection management, and so on.

In some implementations, the UPF 108 is an anchor point for intra-radio access technology (RAT) mobility or inter-RAT mobility. The UPF 108 can also be an external PDU session point of interconnect to a data network 110 connected to the UPF 108. In that regard, the UPF 108 is connected to the SMF 106 via CP interface N4. The UPF 108 can route and forward data packets as an indication from the SMF 106. The UPF 108 can buffer downlink (DL) data while the UE 101 is in an idle mode. The UPF 108 is connected to the 5G-AN 104.

The UDM 112 can store subscription profile for the UEs, including but not limited to, the UE 101. The UDM 112 is connected to the AMF 102 via CP interface N8. The UDM 112 is connected to the SMF 106 via CP interface N10.

The PCF 114 can generate police (e.g., policing and enforcement elements) to govern network behaviors based on subscription and indication from the AF 116. The PCF 114 is connected to the AF 116 via a suitable communication link. The PCF 114 can further provide policy rules to CP functions (e.g., the AMF 102 and the SMF 106), which are configured to enforce those policy rules. For example, the PCF 114 can provide the policy rules to the SMF 106 via CP interface N7.

Each of the communication links, CP interfaces, connections, and so on shown as lines between two of the elements 101-116 can be any suitable wired or wireless connection.

Figure 2:
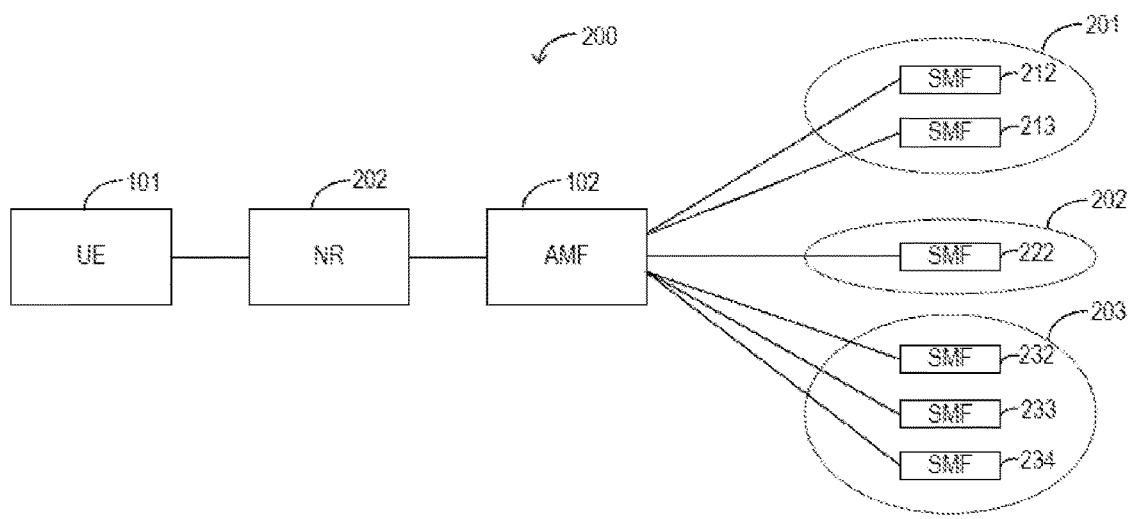
FIG. 2 is a block diagram illustrating an example slice deployment, in accordance with an embodiment of the present disclosure.

FIG. 2 is a block diagram illustrating an example slice deployment 200, in accordance with an embodiment of the present disclosure. Referring to FIGS. 1-2, the slice deployment 200 can be implemented for the network system architecture 100. The UE 101 is connected to a NR 202, which is connected to the AMF 102. The NR 202 is used to refer to a communication network formed by base stations (e.g., gNodeBs (gNBs), and so on). The NR 202 corresponds to the NAS CP interface N1 shown in FIG. 1. The SMF 106 can include multiple SMFs such as but not limited to, SMFs 212, 213, 222, 232, 233, and 234. In the slice deployment 200 as shown, the SMFs 212, 213, 222, 232, 233, and 234 are deployed in different slices. For instance, the SMFs 212 and 213 are deployed in a slice 201. The SMF 222 is deployed in a slice 202. The SMFs 232, 233, and 234 are deployed in a slice 203. The UE 101 can access the different slices 201, 202, and 203 simultaneously. Each of the slices 201, 202, and 203 corresponds to a set of resources such as but not limited to, network bandwidth, processing power, storage, and so on. The UE 101 can connect to different SMFs (e.g., the SMFs 232, 233, and 234) in a same slice (e.g., the slice 203). The different SMFs 232, 233, and 234 can connect to different data networks (DNs) identified and differentiated by different data network names (DNNs), such that each of the different DNs is identified by a different one of the DNNs.

Traditionally, further authentication and authorization by an AAA-S may be needed in order for the UE 101 to access slices (e.g., the slices 201, 202, and 203). The AAA-S can be hosted by a home public land mobile network (H-PLMN) operator or a third party having a business relationship with the H-PLMN operator. Traditionally, during a registration process, based on results of authentication and authorization from the AAA-S, the AMF 102 can determine whether to add a single network slice selection assistance information (S-NSSAI) in a currently allowed NSSAI. However, traditionally, such actions is only used for authentication and authorization.

Figure 3:
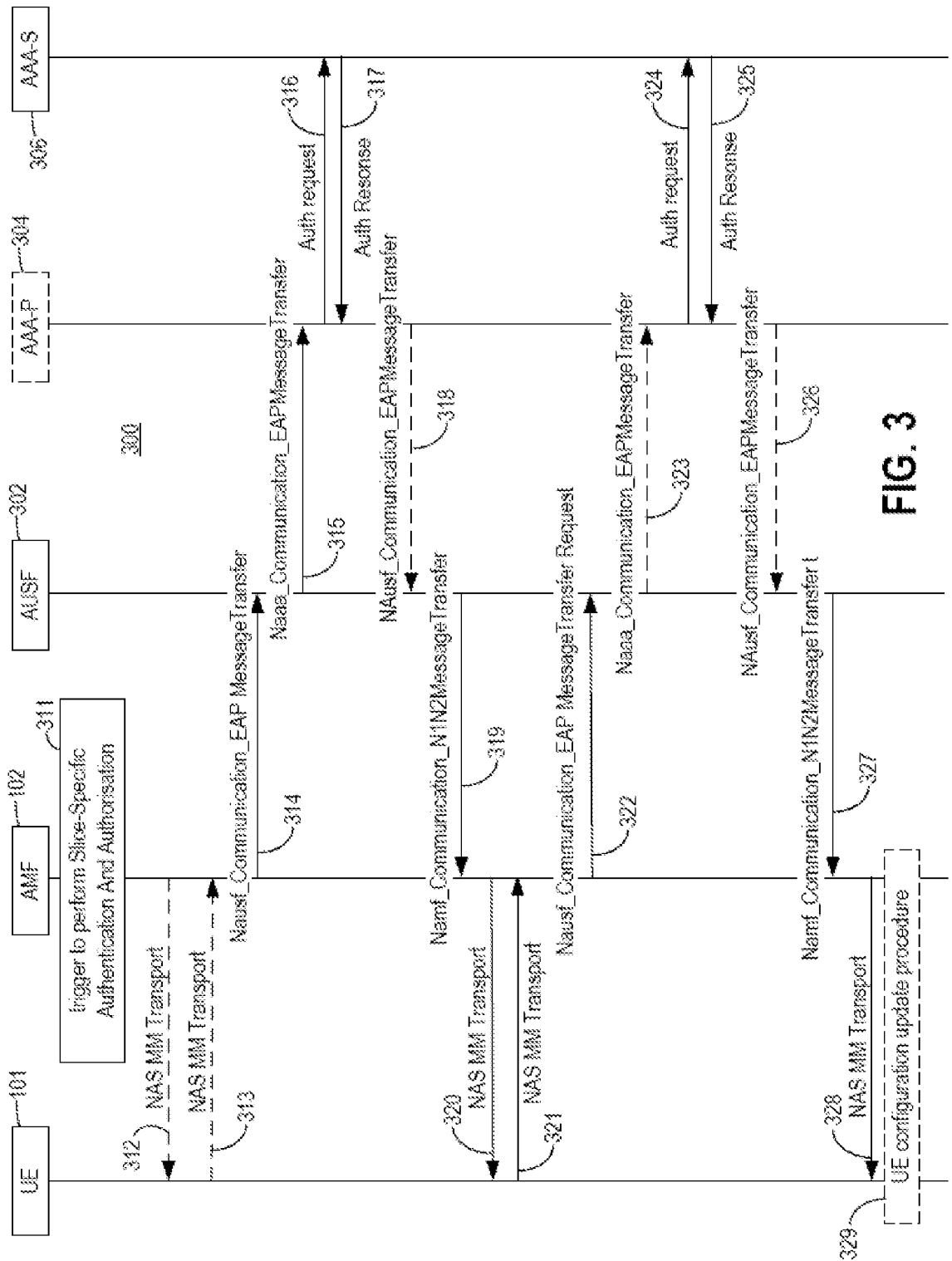
FIG. 3 is a signal diagram illustrating an example procedure for retrieving slice information from an authentication, authorization, and accounting server (AAA-S), in accordance with an embodiment of the present disclosure.

The present disclosure is concerned with reusing the current procedure and extending the messaging in the current procedure to provide additional information to the AMF 102. The current procedure can be a common procedure such as the authentication and authorization procedure mentioned above, a subscription-get procedure, a policy-association-create procedure, or another suitable procedure. In that regard, FIG. 3 is a signal diagram illustrating an example procedure 300 for retrieving slice information from an AAA-S 306, in accordance with an embodiment of the present disclosure. Referring to FIGS. 1-3, slice information provided to the AMF 102 includes at least QoS profile information (e.g., including a slice-AMBR) and a service area (e.g., a restrict area, a restricted area, and so on) for each specific slice. The slice information is information exchanged between the AMF 102 and the AAA-S 306 (directly or indirectly) in addition to other signals/messages exchanged during the common procedure.

With respect to the QoS profile information, the AMF 102 can retrieve the QoS profile information from the AAA-S 306. The AMF 102 can send the QoS profile information to the NR 202 in response to or after the UE 101 enters a connected mode (e.g., the UE 101 is connected to the NR 202). In some examples, the QoS profile information includes at least the slice-AMBR (in addition to other information such as but not limited to, a UE-specific AMBR, a PDU-specific AMBR, a guaranteed flow bit rate (GBR) for a GFBR flow, a QoS class identifier (QCI), and so on). Based on the QoS profile information, the NR 202 can enforce the rate control for an entire slice (e.g., the slice 203) in the scenario in which the UE 101 accesses multiple SMFs (e.g., the SMFs 232, 233, and 234) in the same slice. For example, the NR 202 (including base stations such as but not limited to, the gNBs) can enforce the slice-AMBR as the rate of the multiple SMFs 232, 233, and 234 of the same slice 203 as accessed by the UE 101.

With respect to the service area for a specific slice, the service area applies to the UE 101 in the AMF 102. The procedure shown in FIG. 3 can be used for access control in a finer granularity.

Referring generally to FIG. 3, in a first example, the AMF 102 can send a current location (such as but not limited to, a current tracking area identifier (TAI), a NR node identifier (ID), a cell ID, and so on) of the UE 101 to the AAA-S 306. Responsive to receiving the current location of the UE 101, the AAA-S 306 determines whether the UE 101 is allowed to access a slice (e.g., the slice 203) while being in the current location. Responsive to determining that the UE 101 is allowed (in case of the other authentication and authorization being successful), the AAA-S 306 can return the service area of the slice (e.g., the slice 203) to the AMF 102. In some examples, the other authentication and authorization includes at least the AAA-S 306 authenticating the UE 101 using the EAP procedure based on the EAP ID, and in response to determining that the EAP authentication fails, the UE 101 is not allowed to access the slice. Responsive to determining that the UE 101 is not allowed, the AAA-S 306 can reject the request for the slice and indicate a proper cause/reason.

In a second example, responsive to authentication and authorization success or during an extensible authentication protocol (EAP) message exchange, the AAA-S 306 can provide the service area of the slice (e.g., the slice 203) to the AMF 102 regardless of the current location of the UE 101. In this example, responsive to the AMF 102 receiving the service area of the slice, the AMF 102 checks whether the current location of the UE 101 is in that service area. Responsive to determining that the current location of the UE 101 is not in the service area, the AMF 102 excludes the S-NSSAI of that slice from the allowed NSSAI. On the other hand, responsive to determining that the current location of the UE 101 is in the service area, the AMF 102 includes the S-NSSAI of that slice in the allowed NSSAI.

At 311, the AMF 102 triggers slice-specific authentication and authorization as the common procedure. That is, the AMF 102 can trigger initiation of the network slice-specific authentication and authorization procedure for S-NSSAIs that need network slice-specific authentication and authorization. The AMF 102 can trigger the network slice-specific authentication and authorization procedure based on any change of subscription information in some examples. In alternative examples, the AAA-S 306 can trigger or otherwise instruct the AMF 102 to trigger the network slice-specific authentication and authorization procedure.

In some examples in which the network slice-specific authentication and authorization is triggered as a result of a registration procedure, the AMF 102 can determine based on the UE context information stored in the AMF 102 that for some or all S-NSSAI(s) subject to the network slice-specific authentication and authorization, the UE 101 has already been authenticated following the registration procedure on a first access. Depending on network slice-specific authentication and authorization result (e.g., success or failure) from a previous run over a first access, the AMF 102 can determine, based on any network policies, to skip or omit the network slice-specific authentication and authorization for some of the S-NSSAIs on a second access. That is, the AMF 102 can determine to skip the network slice-specific authentication and authorization for one or more of the S-NSSAIs responsive to determining that the one or more of the S-NSSAIs have been successfully authenticated and authorized during the network slice-specific authentication and authorization for the first access. The second access is subsequent to the first access.

In some examples in which the S-NSSAIs that need network slice-specific authentication and authorization are included in the allowed NSSAI for each access type, the AMF 102 can select an access type for performing the network slice-specific authentication and authorization procedure based on the network policies.

While the authentication and authorization procedure is used in FIG. 3 as an example, other common procedures such as but not limited to, the subscription-get procedure, the policy-association-create procedure, or another suitable procedure can be used to exchange the slide information for the AMF 102.

At 312, the AMF 102 sends a message to the UE 101 to request a UE user ID (e.g., an EAP ID, an EAP authentication ID, or so on) for EAP authentication for an S-NSSAI. The message includes a request for an EAP ID (referred to as an EAP ID request) and the S-NSSAI. The S-NSSAI contained in the message is the S-NSSAI of the H-PLMN, and is not the locally mapped S-NSSAI value. The message is sent via NAS mobility management (MM) transport.

At 313, the UE 101 sends a response back to the AMF 102 via NAS MM transport, where such NAS MM transport message includes an EAP ID response, which contains the requested EAP ID for the S-NSSAI. The NAS MM transport message also includes the S-NSSAI received at 312.

At 314, the AMF 102 sends a message (e.g., via Nausf_Communication_EAPMessage_Transfer) to an authentication server function (AUSF) 302. Such message includes the EAP ID response (which contains the requested EAP ID for the S-NSSAI), an AAA-S address of the AAA-S 306, a generic public subscription identifier (GIPSI), and the S-NSSAI. For the first example in which the AMF 102 sends a current location of the UE 101 to the AAA-S 306, the current location of the UE 101 can also be included in the message sent at 314. As described, the current location can be one or more of a current TA, an NR node ID, or a cell ID used for the UE 101. For the second example in which the AAA-S 306 can provide the service area of the slice to the AMF 102 regardless of the current location of the UE 101, the current location of the UE 101 is not sent at 314.

At 315, the AUSF 302 forwards the message to an authentication, authorization, and accounting proxy (AAA-P) 304 in the implementations in which the AAA-P 304 is present (e.g., because the AAA-S 306 belongs to a third party). The AUSF 302 can invoke the Naaa_Communication_EAPmessageTransfer service to forward the message. The forwarded message includes the EAP ID response (which contains the EAP ID for the S-NSSAI), the AAA-S address of the AAA-S 306, the GIPSI, and the S-NSSAI. For the first example in which the AMF 102 sends a current location of the UE 101 to the AAA-S 306, the current location of the UE 101 can also be included in the message forwarded at 315. For the second example in which the AAA-S 306 can provide the service area of the slice to the AMF 102 regardless of the current location of the UE 101, the current location of the UE 101 is not forwarded at 315.

At 316, the AAA-P 304 associates the AAA-S address of the AAA-S 306 with the S-NSSAI and forwards, to the AAA-S 306 (using the AAA-S address of the AAA-S 306), the EAP ID response (which contains the EAP ID for the S-NSSAI), the GIPSI, and the S-NSSAI. For the first example in which the AMF 102 sends a current location of the UE 101 to the AAA-S 306, the current location of the UE 101 can also be included in the message forwarded at 316. For the second example in which the AAA-S 306 can provide the service area of the slice to the AMF 102 regardless of the current location of the UE 101, the current location of the UE 101 is not forwarded at 316. The EAP ID response can also be referred to as an EAP identity message. The current location of the UE 101 (in the first example but not in the second example), the EAP ID response, the GIPSI, and the S-NSSAI can be sent to the AAA-S 306 in an authentication request as a part of the authentication and authorization procedures in which other aspects are subject to other types of authentication and authorization. In some examples, the other aspects include at least the AAA-S 306 authenticating the UE 101 using the EAP procedure based on the EAP ID, and in response to determining that the EAP authentication fails, the UE 101 is not allowed to access the slice.

Alternatively, in the implementations in which the AAA-P 304 is not present (because the AAA-S 306 belongs to the H-PLMN operator and not a third-party), the AUSF 302 can forward, directly to the AAA-S address of the AAA-S 306, the message which includes the EAP ID response (which contains the EAP ID for the S-NSSAI), the GIPSI, and the S-NSSAI in an authentication request. For the first example in which the AMF 102 sends a current location of the UE 101 to the AAA-S 306, the current location of the UE 101 can also be included in the authentication request sent directly to the AAA-S 306. For the second example in which the AAA-S 306 can provide the service area of the slice to the AMF 102 regardless of the current location of the UE 101, the current location of the UE 101 is not sent.

The AAA-S 306 and the UE 101 exchange EAP messages at 317-324 for EAP authentication. One or more iterations of one or more of blocks 317-324 can be performed.

In the first example in which the AMF 102 sends a current location of the UE 101 to the AAA-S 306, the AAA-S 306 can determine whether the current location of the UE 101 is in the service area of the slice, in response to receiving the current location of the UE 101 (e.g., at 316 or directly from the AUSF 302). In response to determining that the current location of the UE 101 is not within the service area of the slice, the authentication request (e.g., received by the AAA-S 306 at 316) is rejected. For example, the AAA-S 306 can send an authentication response (including at least an EAP message, the GPSI, and the S-NSSAI) to the AAA-P 304 at 317. The EAP message includes at least one an indication of the rejection or a proper cause (e.g., failure to authenticate due to the current location of the UE 101 is outside of the service area of the slice). In the examples in which the AAA-P 304 exists, the AAA-S 306 sends the authentication response to the AAA-P 304 at 317, and the AAA-P 304 forwards the EAP message, the GPSI, and the S-NSSAI to the AUSF 302 via Nausf_Communication_EAPMessageTransfer at 318. Alternatively, in the scenario in which the AAA-P 304 does not exist, the AAA-S 306 sends the authentication response to the AUSF 302 directly. The AUSF 302 can forward the EAP message, the GPSI, and the S-NSSAI via Namf_Communication_N1N2MessageTranfser to the AMF 102, at 319. The AMF 102 accordingly receives the indication of the rejection and the proper cause (e.g., failure to authenticate due to the current location of the UE 101 is outside of the service area of the slice) at 319, and 320-329 can be omitted given that the AAA-S 306 has determined that the UE 101 is not within the service area of the slice.

On the other hand, in response to determining that the current location of the UE 101 is within the service area of the slice in the first example or in the second example in which the AAA-S 306 can provide the service area of the slice to the AMF 102 regardless of the current location of the UE 101, the AAA-S 306 can provide the service area at 317. For example, the AAA-S 306 can send an authentication response (including at least an EAP message, the GPSI, and the S-NSSAI) to the AAA-P 304 at 317. The EAP message includes at least an indication of the authorization and the service area. In the examples in which the AAA-P 304 exists, the AAA-S 306 sends the authentication response (including the service area) to the AAA-P 304 at 317, and the AAA-P 304 forwards the EAP message (including the service area), the GPSI, and the S-NSSAI to the AUSF 302 via Nausf_Communication_EAPMessageTransfer at 318. Alternatively, in the scenario in which the AAA-P 304 does not exist, the AAA-S 306 sends the authentication response (including the service area) to the AUSF 302 directly. The AUSF 302 can forward the EAP message (including the service area), the GPSI, and the S-NSSAI via Namf_Communication_N1N2MessageTranfser to the AMF 102, at 319. The AMF 102 accordingly receives the indication of authorization and the service area.

In response to receiving the service area of the slice that is identified by the S-NSSAI, the AMF 102 determines whether the UE 101 is allowed to access the slice based on the current UE location. In response to the AMF 102 determining that the current location of the UE 101 is not within the service area of the slice, the AMF 102 can abort the slice authentication and authorization procedure, and 320-329 can be omitted. In the scenario in which the authentication and authorization procedure is triggered by allowed S-NSSAI allocation or update (e.g. during a registration process), the S-NSSAI of the slice is excluded from the allowed NSSAI.

On the other hand, in response to the AMF 102 determining that the current location of the UE 101 is within the service area of the slice, the AMF 102 includes the S-NSSAI of the slice in the allowed NSSAI and continues with the slice authentication and authorization procedure 320-329. For example, at 320, the AMF 102 sends the EAP message and the S-NSSAI of the slice to the UE 101 via NAS MM transport. The AMF 102 receives from the UE 101 an EAP message and the S-NSSAI at 321, via the NAS MM transport. The UE 101 performs the general EAP procedure and completes the authentication based on the EAP ID and key.

At 322, the AMF 102 sends a message (e.g., via Nausf_Communication_EAPMessage_Transfer) to the AUSF 302. Such message includes the EAP message, the AAA-S address of the AAA-S 306, the GIPSI, and the S-NSSAI.

At 323, the AUSF 302 can invoke the Nausf_Communication_EAPmessageTransfer service to forward the EAP message, the AAA-S address of the AAA-S 306, the GIPSI, and the S-NSSAI to the AAA-P 304 in the implementations in which the AAA-P 304 is present. At 324, the AAA-P 304 associates the AAA-S address of the AAA-S 306 with the S-NSSAI and sends, to the AAA-S 306 (using the AAA-S address of the AAA-S 306), an authentication request including the EAP message, the GIPSI, and the S-NSSAI. Alternatively, the AUSF 302 directly sends to AAA-S 306 the authentication request including the EAP message, the GIPSI, and the S-NSSAI in the scenario in which the AAA-P 304 does not exist.

The AAA-S 306 performs the EAP authentication responsive to receiving the authentication request at 324. At 325, the AAA-S 306 sends an authentication response to the AAAP-304, the authentication response includes an EAP-success/failure message, the GPSI, and the S-NSSAI. The EAP-success/failure message indicates whether the EAP authentication is successful or unsuccessful. At 326, the AAA-P 304 forwards the EAP-success/failure message, the GPSI, and the S-NSSAI to the AUSF 302 via Nausf_Communication_EAPmessageTransfer. In the scenario in which the AAA-P 304 is not present, the AAA-S 306 sends the EAP-success/failure message, the GPSI, and the S-NSSAI directly to the AUSF 302. At 327, the AUSF 302 sends the EAP-success/failure message, the GPSI, and the S-NSSAI to the AMF 102 via Namf_Communication_N1N2messageTransfer.

In some examples, the AAA-S 306 can provide the QoS profile to the AMF 102 via the AUSF 302. For example, in the scenario in which AAA-P 304 exists, the QoS profile (including the slice-specific AMBR for the slice) for the slice can be sent to the AAAP-304 as part of the authentication response at 325. The QoS profile as included in the Nausf_Communication_EAPmessageTransfer message can be relayed by the AAA-P 304 to the AUSF 302 at 326. Alternatively, in the example in which the AAA-P 304 does not exist, the AAA-S 306 can send the QoS profile directly to the AUSF 302 along with the EAP-success/failure message, the GPSI, and the S-NSSAI. The AUSF 302 can forward the QoS profile as part of the Namf_Communication_N1N2messageTransfer message to the AMF 102, at 327. The AMF 102 determines the slice-specific AMBR contained in the QoS profile based on any operator policy and sends the slice-specific AMBR to the NR 202.

Alternative to conveying the service area information at 317-319, the service area of the slice can be conveyed using 325-327. For example, whereas the current location of the UE 101 is within the service area of the slice in the first example or in the second example in which the AAA-S 306 can provide the service area of the slice to the AMF 102 regardless of the current location of the UE 101, the AAA-S 306 can provide the service area at 325. In the examples in which the AAA-P 304 exists, the AAA-S 306 sends the service area of the slice as part of the authentication response to the AAA-P 304 at 325, and the AAA-P 304 forwards the service area of the slice as part of the authentication response to the AUSF 302 via Nausf_Communication_EAPMessageTransfer at 326. Alternatively, in the scenario in which the AAA-P 304 does not exist, the AAA-S 306 sends the service area of the slice to the AUSF 302 directly. The AUSF 302 can forward the service area of the slice via Namf_Communication_N1N2MessageTranfser to the AMF 102, at 327. The AMF 102 accordingly receives the indication of authorization and the service area. In response to receiving the service area of the slice that is identified by the S-NSSAI at 327, the AMF 102 can determine whether the UE 101 is allowed to access the slice based on the current UE location.

At 328, the AMF 102 transmits a NAS MM transport message including the EAP-success/failure message to the UE 101. In response to determining that a new allowed NSSAI or a new rejected NSSAI needs to be delivered to the UE 101, or in response to determining that the AMF 102 re-allocation is required, the AMF 102 initiates the UE configuration update procedure (for each Access Type), at 329. In response to determining that the network slice-specific authentication and authorization has failed for all S-NSSAIs in the allowed NSSAI, the AMF 102 executes a network-initiated deregistration procedure, and the AMF 102 includes in the explicit de-registration request message the list of rejected S-NSSAIs, each of which with the appropriate rejection cause value indicative of a corresponding rejection cause.

In some embodiments, the AAA-S 306 can request the revocation of authorization for the network slice specified by the S-NSSAI in the revoke authorization request message. During such a procedure, the AAA-S 306 can update the QoS profile and service area of the slice. The updated QoS profile (with an updated slice-specific AMBR) and the updated service area can be transmitted to the AMF 102 in any suitable manner. The AAA-S 306 can request the re-authentication and re-authorization for the slice specified by the S-NSSAI in the re-authentication request message. Responsive to the AMF 102 receiving the re-authentication request, the AMF 102 triggers the slice-specific authentication and authorization procedure such as but not limited to the one described with reference to FIG. 3. During the re-authentication and re-authorization procedure, the AAA-S 306 can also include the update slice information at 317 or 325.

Figure 4:
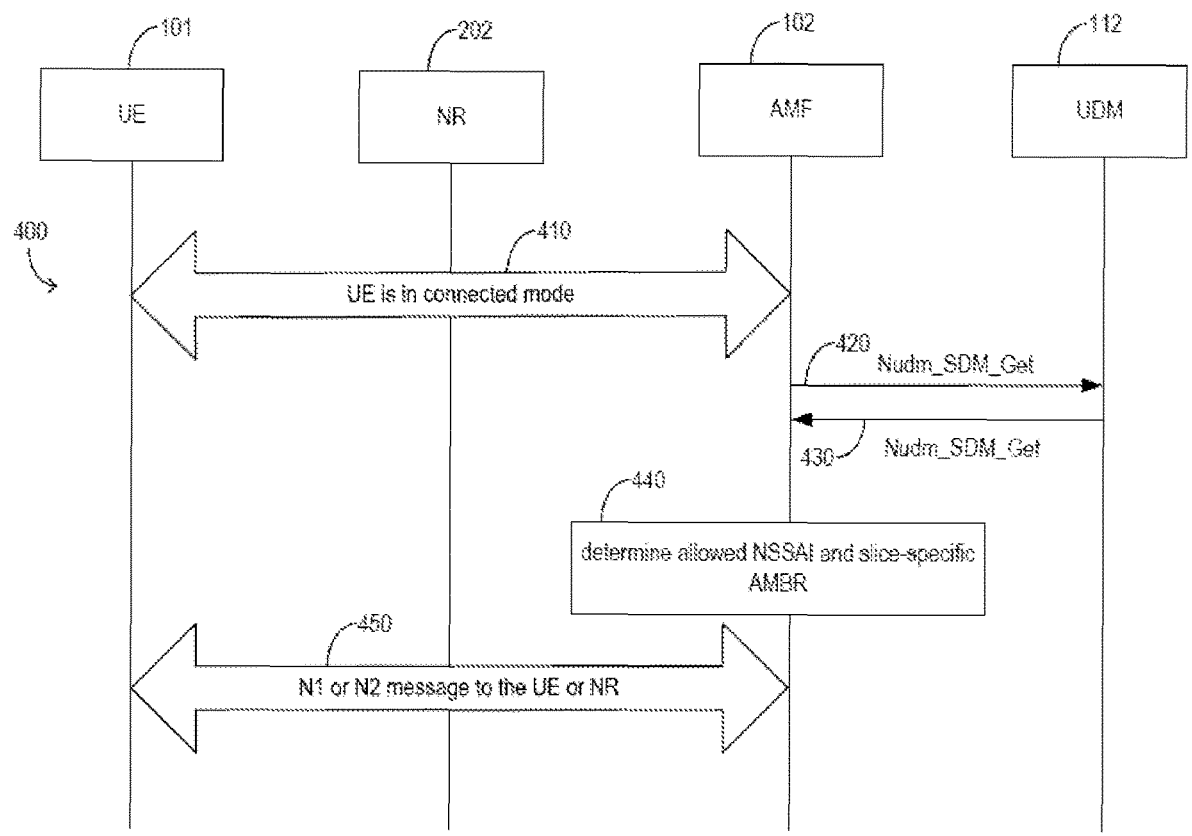
FIG. 4 is a signal diagram illustrating an example procedure for retrieving slice information from a unified data management (UDM), in accordance with an embodiment of the present disclosure.

FIG. 4 is a signal diagram illustrating an example procedure 400 for retrieving slice information from the UDM 112 (FIG. 1), in accordance with an embodiment of the present disclosure. Referring to FIGS. 1-4, the procedure 400 relates to the AMF 102 retrieving the slice information such as but not limited to, the QoS profile (including at least the slice-specific AMBR) and the service area of the slice from the UDM 112.

The UE 101 is in a connected mode at 410 and is connected to the 102 for receiving subscription data. During a registration procedure and a handover (HO) procedure, in response to determining that the AMF 102 does not have subscription data for the UE 101, the AMF 102 retrieves the access and mobility subscription data, SMF selection subscription data, and UE context in SMF data from the UDM 112 (e.g., using Nudm_SDM_Get) at 420 and 430. The slice information can be retrieved from the UDM 112 at the same time using Nudm_SDM_Get at 420 and 430. That is, the slice information can be requested at 420 and received at 430 together with the access and mobility subscription data, SMF selection subscription data, and UE context in SMF data from the UDM 112 (e.g., using Nudm_SDM_Get) responsive to determining that the AMF 102 does not have subscription data for the UE 101. The UDM 112 can obtain the slice information from a unified data repository (UDR)

(not shown) responsive to the AMF 102 sending a Nudm_SDM_Get message to the UDM 112. The UDM 112 retrieves the slice information from the UDR by querying the UDR for the slice information (e.g., using Nudr_DM_Query).

At 440, the AMF 102 can determine the allowed NSSAI and the slice-specific AMBR. For example, if a subscribed NSSAI is included in the Nudm_SDM_Get message at 430 as part of subscription data in the Nudm_SDM_Get message, slice QoS profile of each subscribed S-NSSAI is also included. The AMF 102 can determine whether there is an active PDU session of the slice corresponding to each subscribed S-NSSAI. In response to determining the active PDU session of a slice, the AMF 102 generates the slice-specific AMBR included in the subscribed slice QoS profile based on operator policies. Responsive to determining the slice-specific AMBR, the AMF 102 sends the slice-specific AMBR to the UE 450 via CP interface N1 or the NR 202 (e.g., the 5G-AN 104) via CP interface N2.

If a subscribed NSSAI is included in the Nudm_SDM_Get message at 430 as part of subscription data in the Nudm_SDM_Get message, service area of each subscribed S-NSSAI may be also included. The AMF 102 can determine whether the UE 101 is allowed to access the slice based on the current UE location. In response to determining that the UE 101 is not allowed to access the slice because the current UE location is outside of the service area and that this registration procedure or the HO procedure is triggered by allowed S-NSSAI allocation or update (e.g., during registration), the S-NSSAI corresponding to the slice is excluded from the allowed NSSAI.

In some embodiments, responsive to receiving a successful response from the UDM 112 indicating that the subscription data and the slice information have been received by the AMF 102 at 430, the AMF 102 subscribes (e.g., using Nudm_SDM_Subscribe) to the UDM 112 to be notified responsive to any changes to the requested subscription data. The UDM 112 subscribes (e.g., using Nudr_DM_Subscribe) to the UDR to be notified responsive to any modification the requested subscription data.

In response to the UDR determining that the subscription data has changed, the UDR pushes the updated subscription data to the UDM 112 via Nudr_DM_Subscribe. The UDM 112 then notifies the AMF 102 via Nudm_SDM_Subscribe. Responsive to the AMF 102 receiving the updated subscription data from the UDM 112, the AMF 102 checks the slice information received from the UDM 112, where the slice information corresponds to the updated subscription data. In response to determining that the slice-specific AMBR has changed and that there is an active PDU session for the slice, the AMF 102 updates the slice-specific AMBR for that slice to be the updated slice-specific AMBR included in the updated subscribed QoS profile and then sends the updated slice-specific AMBR to the NR 202 (e.g., the 5G-AN 104) via CP interface N2.

In some examples, in response to determining that a service area of an S-NSSAI has changed and such S-NSSAI is included in the allowed NSSAI, the AMF 102 checks whether the UE 101 is allowed to access the slice based on the current UE location. In response to determining that the current location of the UE 101 is outside of the service area of the slice, the AMF 102 can release all PDU sessions for such slice. The AMF 102 can generate a new allowed NSSAI or a new registration area based on the service area of slice and the current location UE of the UE 101. As the UE 101 moves inside of a registration area, the UE 101 does not need to initiate mobility registration.

For example, in order to ensure that the UE 101 can access some specific slices, the AMF 102 can generate a registration area of the UE 101 that includes the service areas of these slices (e.g., if a tracking area 1 (TA1) is not included in the service area of Slice A, the registration excludes such TA1. However, excluding TA1 from the registration is optional for registration area generation. The registration area can still include TA1. However the S-NSSAI of slice A is not included in the allowed NSSAI.

Figure 5:
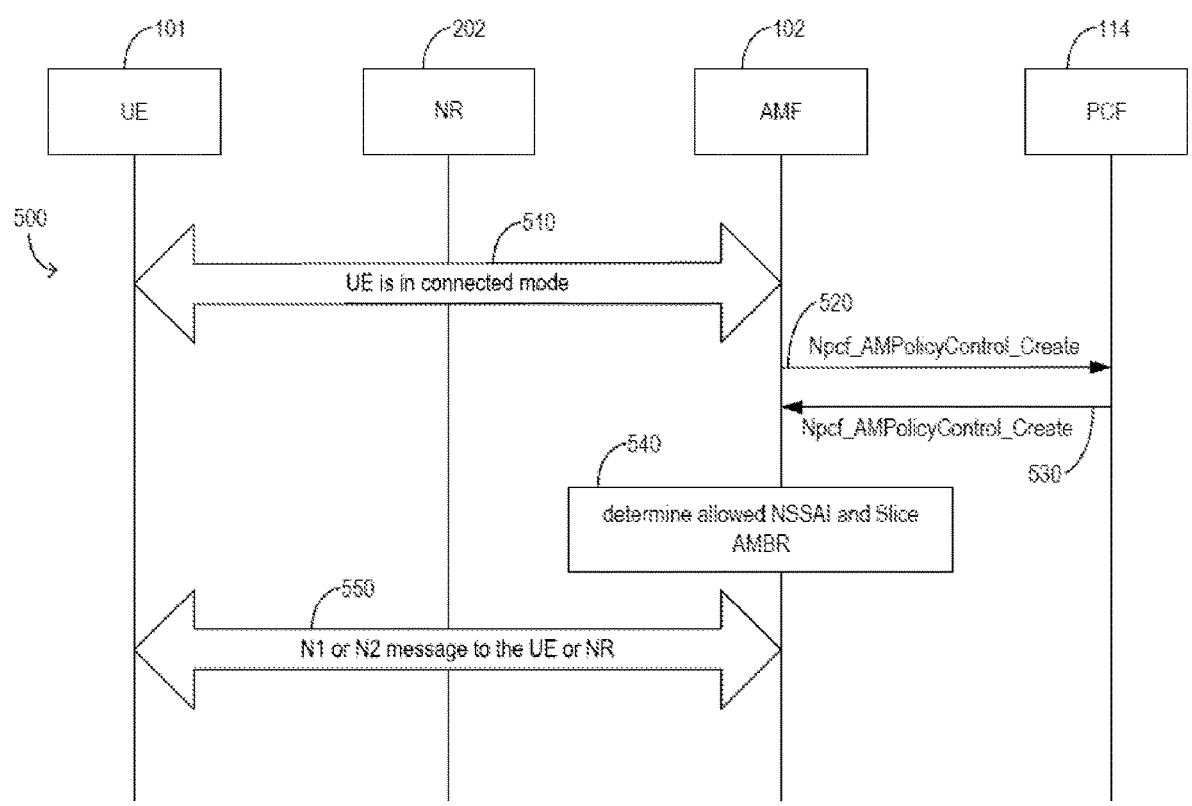
FIG. 5 is a signal diagram illustrating an example procedure for retrieving slice information from the policy control function (PCF), in accordance with an embodiment of the present disclosure.

FIG. 5 is a signal diagram illustrating an example procedure 500 for retrieving slice information from the PCF 114 (FIG. 1), in accordance with an embodiment of the present disclosure. Referring to FIGS. 1-5, the procedure 500 relates to the AMF 102 retrieving the slice information such as but not limited to, the QoS profile (including at least the slice-specific AMBR) and the service area of the slice from the PCF 114. In other words, the procedure 500 is similar to the procedure 400, except that the slice information is retrieved from the PCF 114 instead of the UDM 112. In a roaming scenario, the AMF 102 retrieves the slice information from a V-PCF (visited-PCF), and the V-PCF can retrieves the slice information from a H-PCF (home-PCF). In some examples, responsive to the V-PCF receiving the slice information from the H-PCF, the V-PCF can modify the slice information such as but not limited to, adjusting the slice-specific AMBR based on a visited operator, adding/removing a service area of the slice, and so on. Because the H-PLMN may not have knowledge of the topology in visited PLMN (V-PLMN), the service area of the slice can be generated by the V-PCF. As such, the PCF 114 can represent both the V-PCF and the H-PCF.

The UE 101 is in a connected mode at 510 and is connected to the AMF 102 for receiving subscription data. During a registration procedure and a HO procedure, the AMF 102 can create or update an association toward the PCF 114.

In response to determining that the AMF 102 has not yet obtained the access and mobility policies for the UE 101 or in response to determining that the access and mobility policies in the AMF 102 are no longer valid, the AMF 102 requests the PCF 114 to apply operator policies for the UE 101 from the PCF 114.

For example, at 520, the AMF 102 sends a Npcf_AMPolicyControl_Create message to the PCF 114 to establish an access and mobility policy control association with the PCF 114. The PCF 114 responds to the Npcf_AMPolicyControl_Create service operation by providing the AM-related policy information (e.g., service area restrictions) at 530 in a Npcf_AMPolicyControl_Create message. The PCF 114 can also include the slice information in the Npcf_AMPolicyControl_Create message at 530.

At 540, the AMF 102 can determine the allowed NSSAI and the slice-specific AMBR. For example, the slice information includes the slice QoS profile of each subscribed S-NSSAI in the Npcf_AMPolicyControl_Create message received by the AMF 102 at 530. The AMF 102 can determine whether there is an active PDU session of a slice corresponding to each subscribed S-NSSAI. In response to determining that there is an active PDU session for the slice, the AMF 102 sends the slice-specific AMBR to the NR 202 (e.g., the 5G-AN 104) to be enforced.

The slice information includes the service area of each subscribed S-NSSAI in the Npcf_AMPolicyControl_Create message received by the AMF 102 at 530. The AMF 102 can determine whether the UE 101 is allowed to access the slice based on the current UE location. In response to determining that the current location of the UE 101 is outside of the service area of a slice and this procedure 500 is triggered by allowed S-NSSAI allocation or update (e.g. during registration), the S-NSSAI corresponding to the slice is excluded from the allowed NSSAI.

In some examples, the AMF 102 can subscribe to the PCF 114 to be notified responsive to any changes to the slice information. If the slice information changes and the AMF 102 is subscribed to the PCF 114 to be notified of such change, the PCF 114 pushes (transmits) the updated slice information to the AMF 102. The updated slice information can include an updated slice-specific AMBR for a given slice, where the updated slice-specific AMBR is included as part of the updated slice information. In response to the AMF 102 receiving the updated slice information, the AMF 102 determines to trigger some procedure. In response to determining that the slice-specific AMBR changes for a slice and that there is an active PDU session of the slice, the AMF 102 can update the slice-specific AMBR included in the updated subscribed QoS profile and sends the updated slice AMBR to the NR 202 (the 5G-AN 104) to be enforced.

In some examples, in response to determining that a service area of an S-NSSAI has changed and such S-NSSAI is included in the allowed NSSAI, the AMF 102 checks whether the UE 101 is allowed to access the slice based on the current UE location. In response to determining that the current location of the UE 101 is outside of the service area of the slice, the AMF 102 can release all the PDU sessions for such slice. The AMF 102 can generate a new allowed NSSAI or a new registration area based on the service area of slice and the current location UE of the UE 101.

FIG. 6 is a flow diagram illustrating an example method 600 for retrieving and using slice information from a NF, in accordance with an embodiment of the present disclosure. Referring to FIGS. 1-6, the method 600 is performed by the AMF 102. The NF can be the AAA-S 306 (as shown in FIG. 3), the UDM 112 (as shown in FIG. 4), the PCF 114 (as shown in FIG. 5), or a network slice selection function (NSSF).

At 610, the AMF 102 receives from the NF the slice information. The slice information includes at least one of a QoS profile for a slice or a service area of the slice. In the examples in which the NF is the AAA-S 306, the slice information can be received by the AMF 102 using 317-319 and/or 325-327. In the examples in which the NF is the UDM 112, the slice information can be received by the AMF 102 using 430. In the examples in which the NF is the PCF 114, the slice information can be received by the AMF 102 using 530. In the examples in which the NF is the NSSF, responsive to the NSSF receiving the request from the AMF 102, the NSSF sends a response to the AMF 102 that includes the allowed NSSAI for an applicable access type(s). The NSSF can include the slice information in the response. The slice information includes at least the QoS profile (containing the slice-specific AMBR) for each slice identified by a S-NSSAI and a service area for each slice identified S-NSSAI.

In some examples, the AMF 102 can store the slice information in the UE context in a storage device of the AMF 102. During the registration and HO procedure (with the AMF 102 unchanged), the AMF 102 can check the slice information stored in the UE context for allowed NSSAI generation or update.

At 620, the AMF 102 performs at least one of determining that the UE 101 is authorized to access a slice based on the service area of the slice, or sending the QoS profile including the AMBR specific to the slice to the RN 202 (e.g., the 5G-AN 104). The RN 202 can enforce rate control with respect to the slice for the UE 101 based on the slice-specific AMBR. In the examples in which the NF is the AAA-S 306, the UDM 112, or the PCF 114, the AMF 102, the AMF 102 can determine that the UE 101 is authorized to access a slice or can send the QoS profile including the AMBR specific to the slice to the RN 202 in the manner described by FIGS. 3-5. In the examples in which the NF is the NSSF, responsive to the AMF 102 receiving the service area, the AMF 102 can generate the registration area based on the allowed NSSAI and the corresponding service area. Responsive to the AMF 102 receiving the QoS profile, the AMF 102 can sending the QoS profile including the AMBR specific to the slice to the RN 202.

In some embodiments, upon a PDU session for a slice being established or the UP connection for an established PDU session of a slice being activate, the AMF 102 can send the slice QoS profile for that slice to the NR 202. The NR 202 can use the parameter of the QoS profile (e.g., the slice-specific AMBR) to control the bit rate of non-GBR flows for the whole slice. The AMF 102 finds the S-NSSAI identifying the slice related with a PDU session ID of the PDU session and confirms the slice-specific AMBR. In some examples, the AMF 102 can include only the slice-specific AMBR to the NR 202 when the first PDU session of the slice is established or the first UP connection for an established PDU session in the slice is activated.

For sending the updated slice-specific AMBR, the AMF 102 can initiate a CP interface N2 request that includes the updated slice-specific AMBR to the NR 202. As the UE 101 moves to a new NR during the HO procedure, the AMF 102 can notify the new NR the updated slice-specific AMBR responsive to the AMF 102 receiving the updated slice-specific AMBR from the NF (e.g., the UDM 112 or the PCF 114). This notification (including the updated slice-specific AMBR) can be combined with any existing N2 message sent from the AMF 102 to the NF, for example, by extending an information element (IE) to transfer the notification with the existing N2 message. In the scenario in which no existing proper N2 message is available, the AMF 102 can send notification by itself, in a separated N2 message.

FIG. 7A illustrates a block diagram of an example base station 702, in accordance with some embodiments of the present disclosure. FIG. 7B illustrates a block diagram of an example the UE 101, in accordance with some embodiments of the present disclosure. Referring to FIGS. 1-7B, the base station 702 and the UE 101 can include components and elements configured to support known or conventional operating features that need not be described in detail herein. In one illustrative embodiment, the base station 702 and the UE 101 can be used to communicate (e.g., transmit and receive) data symbols in a wireless communication environment such as the network system architecture 100 and the slice deployment 200, as described above. For instance, the base station 702 can be a base station (e.g., gNodeBs (gNBs), and so on), a server, a node, or any suitable computing device used to implement the NFs (e.g., the AMF 102, the SMF 106, the UPF 108, the UDM 112, the PCF 114, the AF 116, and so on) and to provide the networks 104, 110, and 202.

The base station 702 includes a transceiver module 710, an antenna 712, a processor module 714, a memory module 716, and a network communication module 718. The module 710, 712, 714, 716, and 718 are operatively coupled to and interconnected with one another via a data communication bus 720. The UE 101 includes a UE transceiver module 730, a UE antenna 732, a UE memory module 734, and a UE processor module 736. The modules 730, 732, 734, and 736 are operatively coupled to and interconnected with one another via a data communication bus 740. The base station 702 communicates with the UE 101 or another base station via a communication channel, which can be any wireless channel or other medium suitable for transmission of data as described herein.

As would be understood by persons of ordinary skill in the art, the base station 702 and the UE 101 can further include any number of modules other than the modules shown in FIGS. 7A and 7B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 730 includes a radio frequency (RF) transmitter and a RF receiver each comprising circuitry that is coupled to the antenna 732. A duplex switch (not shown) may alternatively couple the RF transmitter or receiver to the antenna in time duplex fashion. Similarly, in accordance with some embodiments, the transceiver 710 includes an RF transmitter and a RF receiver each having circuitry that is coupled to the antenna 712 or the antenna of another base station. A duplex switch may alternatively couple the RF transmitter or receiver to the antenna 712 in time duplex fashion. The operations of the two transceiver modules 710 and 730 can be coordinated in time such that the receiver circuitry is coupled to the antenna 732 for reception of transmissions over a wireless transmission link at the same time that the transmitter is coupled to the antenna 712. In some embodiments, there is close time synchronization with a minimal guard time between changes in duplex direction.

The UE transceiver 730 and the transceiver 710 are configured to communicate via the wireless data communication link, and cooperate with a suitably configured RF antenna arrangement 712/732 that can support a particular wireless communication protocol and modulation scheme. In some illustrative embodiments, the UE transceiver 710 and the transceiver 710 are configured to support industry standards such as the Long Term Evolution (LTE) and emerging 5G standards, and the like. It is understood, however, that the present disclosure is not necessarily limited in application to a particular standard and associated protocols. Rather, the UE transceiver 730 and the base station transceiver 710 may be configured to support alternate, or additional, wireless data communication protocols, including future standards or variations thereof.

The transceiver 710 and the transceiver of another base station (such as but not limited to, the transceiver 710) are configured to communicate via a wireless data communication link, and cooperate with a suitably configured RF antenna arrangement that can support a particular wireless communication protocol and modulation scheme. In some illustrative embodiments, the transceiver 710 and the transceiver of another base station are configured to support industry standards such as the LTE and emerging 5G standards, and the like. It is understood, however, that the present disclosure is not necessarily limited in application to a particular standard and associated protocols. Rather, the transceiver 710 and the transceiver of another base station may be configured to support alternate, or additional, wireless data communication protocols, including future standards or variations thereof.

In accordance with various embodiments, the base station 702 may be a base station such as but not limited to, an eNB, a serving eNB, a target eNB, a femto station, or a pico station, for example. The base station 702 can be an RN, a regular, a DeNB, a gNB, or an IAB donor. In some embodiments, the UE 101 may be embodied in various types of user devices such as a mobile phone, a smart phone, a personal digital assistant (PDA), tablet, laptop computer, wearable computing device, etc. The processor modules 714 and 736 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 714 and 736, respectively, or in any practical combination thereof. The memory modules 716 and 734 may be realized as RAM memory, flash memory, ROM memory, EPROM memory, EEPROM memory, registers, a hard disk, a removable disk, a CD-ROM, or any other form of storage medium known in the art. In this regard, memory modules 716 and 734 may be coupled to the processor modules 710 and 730, respectively, such that the processors modules 710 and 730 can read information from, and write information to, memory modules 716 and 734, respectively. The memory modules 716 and 734 may also be integrated into their respective processor modules 710 and 730. In some embodiments, the memory modules 716 and 734 may each include a cache memory for storing temporary variables or other intermediate information during execution of instructions to be executed by processor modules 710 and 730, respectively. Memory modules 716 and 734 may also each include non-volatile memory for storing instructions to be executed by the processor modules 710 and 730, respectively.

The network communication module 718 generally represents the hardware, software, firmware, processing logic, and/or other components of the base station 702 that enable bi-directional communication between the transceiver 710 and other network components and communication nodes in communication with the base station 702. For example, the network communication module 718 may be configured to support internet or WiMAX traffic. In a deployment, without limitation, the network communication module 718 provides an 802.3 Ethernet interface such that the transceiver 710 can communicate with a conventional Ethernet based computer network. In this manner, the network communication module 718 may include a physical interface for connection to the computer network (e.g., Mobile Switching Center (MSC)). In some embodiments in which the base station 702 is an IAB donor, the network communication module 718 includes a fiber transport connection configured to connect the base station 702 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
receiving, by a mobility management function (AMF) from a network function (NF), slice information comprising a quality of service (QoS) profile for a slice; and
sending, by the AMF in response to receiving the slice information, the QoS profile comprising a slice-specific aggregate maximum bit rate (AMBR) specific to the slice to a radio access network, wherein the radio access network enforces rate control with respect to the slice for a wireless communication device based on the slice-specific AMBR in response to receiving the QoS profile.

2. The method of claim 1, wherein
the radio access network is a next generation radio access network (NR);
the NR is supported by a plurality of base stations;
the AMF is implemented on a server having a processor and a memory; and
the wireless communication device access a plurality of session management function (SMFs) in the same slice.

3. The method of claim 1, wherein the radio access network enforces the rate control for the slice by enforcing the rate control for all the active PDU sessions in a same slice based on the slice-specific AMBR, and the wireless communication device establish at least one PDU session in the same slice.

4. The method of claim 1, wherein
the NF comprises a data management module; and
the data management module corresponds to a unified data management (UDM).

5. The method of claim 1, further comprising:
receiving, by the AMF, updated subscription data;
determining, by the AMF, that updated slice information for the updated subscription data comprises an updated slice-specific AMBR; and
sending, by the AMF, the updated slice-specific AMBR to the radio access network.

6. A wireless communication apparatus, comprising:
at least one processor configured to:
receive, via a transceiver from a network function (NF), slice information comprising a quality of service (QoS) profile for a slice; and
send, via the transceiver in response to receiving the slice information, the QoS profile comprising a slice-specific aggregate maximum bit rate (AMBR) specific to the slice to a radio access network, wherein the radio access network enforces rate control with respect to the slice for a wireless communication device based on the slice-specific AMBR in response to receiving the QoS profile.

7. The wireless communication apparatus of claim 6, wherein
the radio access network is a next generation radio access network (NR);
the NR is supported by a plurality of base stations;
the AMF is implemented on a server having a processor and a memory; and
the wireless communication device accesses a plurality of session management function (SMFs) in a same slice.

8. The wireless communication apparatus of claim 6, wherein the radio access network enforces the rate control for the slice by enforcing the rate control for all active PDU sessions in a same slice based on the slice-specific AMBR, and the wireless communication device established at least one PDU session in the same slice.

9. The wireless communication apparatus of claim 6, wherein
the NF comprises a data management module; and
the data management module corresponds to a unified data management (UDM).

10. The wireless communication apparatus of claim 6, wherein at least one processor is further configured to:
receive, via the transceiver, updated subscription data;
determine that updated slice information for the updated subscription data comprises an updated slice-specific AMBR; and
send, via the transceiver, the updated slice-specific AMBR to the radio access network.

11. A method, comprising:
sending, by a network function (NF) to a mobility management function (AMF), slice information comprising a quality (QoS) profile for a slice,
wherein the AMF, in response to receiving the slice information, sends the QoS profile comprising a slice-specific aggregate maximum bit rate (AMBR) specific to the slice to a radio access network, and the radio access network enforces rate control with respect to the slice for a wireless communication device based on the slice-specific AMBR in response to receiving the QoS profile.

12. The method of claim 11, wherein
the radio access network is a next generation radio access network (NR);
the NR is supported by a plurality of base stations;
the AMF is implemented on a server having a processor and a memory; and
the wireless communication device accesses a plurality of session management function (SMFs) in the same slice.

13. The method of claim 11, wherein the radio access network enforces the rate control for the slice by enforcing the rate control for all active PDU sessions in the same slice based on the slice-specific AMBR, and the wireless communication device establishes at least one PDU session in the same slice.

14. The method of claim 11, wherein
the NF comprises a data management module; and
the data management module corresponds to a unified data management (UDM).

15. The method of claim 11, wherein the AMF is configured to:
receive updated subscription data;
determine that updated slice information for the updated subscription data comprises an updated slice-specific AMBR; and
send the updated slice-specific AMBR to the radio access network.

16. A wireless communication apparatus, comprising:
at least one processor configured to:
send, via a transmitter to a mobility management function (AMF), slice information comprising a quality of service (QoS) profile for a slice,
wherein the AMF, in response to receiving the slice information, sends the QoS profile comprising a slice-specific aggregate maximum bit rate (AMBR) specific to the slice to a radio access network, and the radio access network enforces rate control with respect to the slice for a wireless communication device based on the slice-specific AMBR in response to receiving the QoS profile.

17. The wireless communication apparatus of claim 16, wherein
- the radio access network is a next generation radio access network (NR);
- the NR is supported by a plurality of base stations;
- the AMF is implemented on a server having a processor and a memory; and
- the wireless communication device accesses a plurality of session management function (SMFs) in the same slice.

18. The wireless communication apparatus of claim 16, wherein the radio access network enforces the rate control for the slice by enforcing the rate control for all active PDU sessions in the same slice based on the slice-specific AMBR, and the wireless communication device establishes at least one PDU session in the same slice.

19. The wireless communication apparatus of claim 16, wherein
- the NF comprises a data management module; and
- the data management module corresponds to a unified data management (UDM) of the radio access network.

20. The wireless communication apparatus of claim 16, , wherein the AMF is configured to:
- receive updated subscription data;
- determine that updated slice information for the updated subscription data comprises an updated slice-specific AMBR; and
- send the updated slice-specific AMBR to the radio access network.

* * * * *